No. 827,399. PATENTED JULY 31, 1906.
S. L. SHEUERMAN & J. F. HAND.
M. N. BAKER, ADMINISTRATOR OF J. F. HAND, DEC'D.
APPARATUS FOR PURIFYING WATER.
APPLICATION FILED MAY 20, 1905.

2 SHEETS—SHEET 1.

Attest:
L. L. Leibeck.
L. H. Orwig

Inventors S. L. Sheuerman,
and Juan F. Hand.
by R. C. Orwig Atty.

THE NORRIS PETERS CO., WASHINGTON, D. C.

No. 827,399. PATENTED JULY 31, 1906.
S. L. SHEUERMAN & J. F. HAND.
M. N. BAKER, ADMINISTRATOR OF J. F. HAND, DEC'D.
APPARATUS FOR PURIFYING WATER.
APPLICATION FILED MAY 20, 1905.
2 SHEETS—SHEET 2.
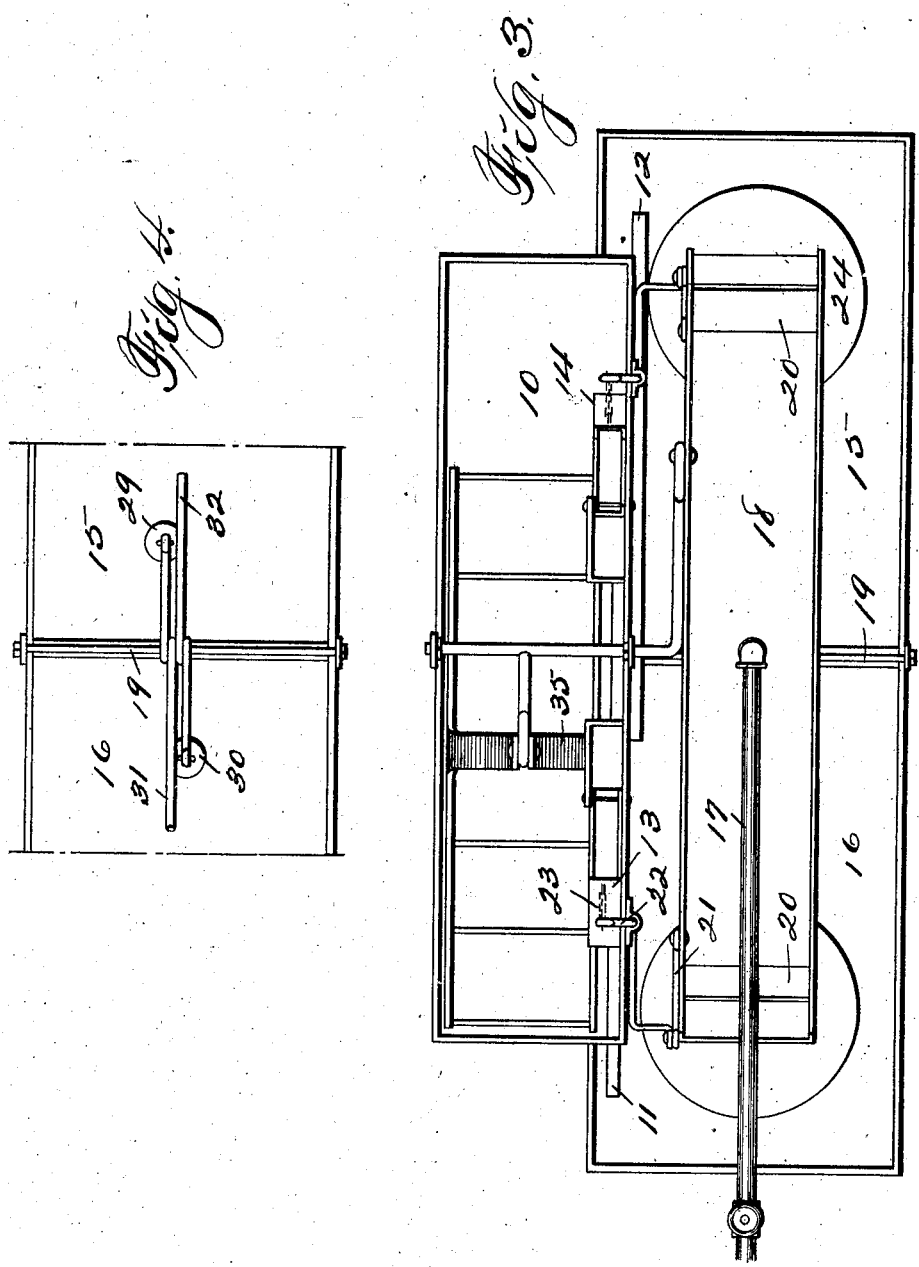

UNITED STATES PATENT OFFICE.

SOLOMON L. SHEUERMAN AND JUAN F. HAND, OF DES MOINES, IOWA; M. N. BAKER ADMINISTRATOR OF SAID JUAN F. HAND, DECEASED.

APPARATUS FOR PURIFYING WATER.

No. 827,399.  Specification of Letters Patent.  Patented July 31, 1906.

Application filed May 20, 1905. Serial No. 261,410.

*To all whom it may concern:*

Be it known that we, SOLOMON L. SHEUERMAN and JUAN F. HAND, citizens of the United States of America, and residents of Des Moines, in the county of Polk and State of Iowa, have invented certain new and useful Improvements in or Relating to Apparatus for Purifying Water, of which the following is a specification.

The invention has for its object to remove automatically from feed-water for steam-boilers or the like such matters as may produce sediment or incrustation, to prevent said matters entering the boilers, and to admit only pure water, and involves automatic means for the addition to and the mixing with the water of certain named ingredients, such as lime and soda.

The apparatus to which this application is directed is one intended to secure the accurate addition to and thorough intermingling with the water of these ingredients and is applicable where crude or natural water is used for feeding.

The purifying process consists in adding a suitable chemical solution or reagent for any special kind of water, and in cases where the reagent is apt to cause a sediment if not stirred up provision is made for maintaining the same in a perfect and constant solution.

Reference is to be had to the accompanying drawings, forming a part of this specification, in which similar reference-numerals designate corresponding parts in all the views.

Figure 1:
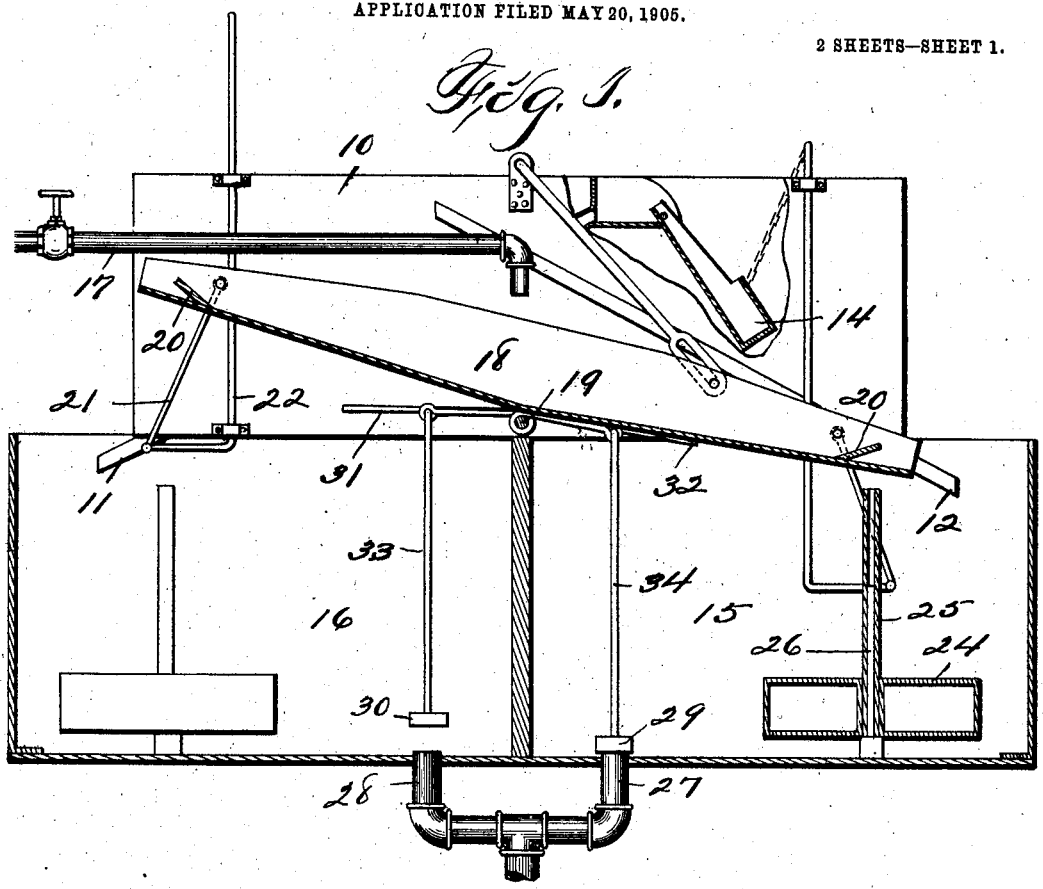
Figure 2:
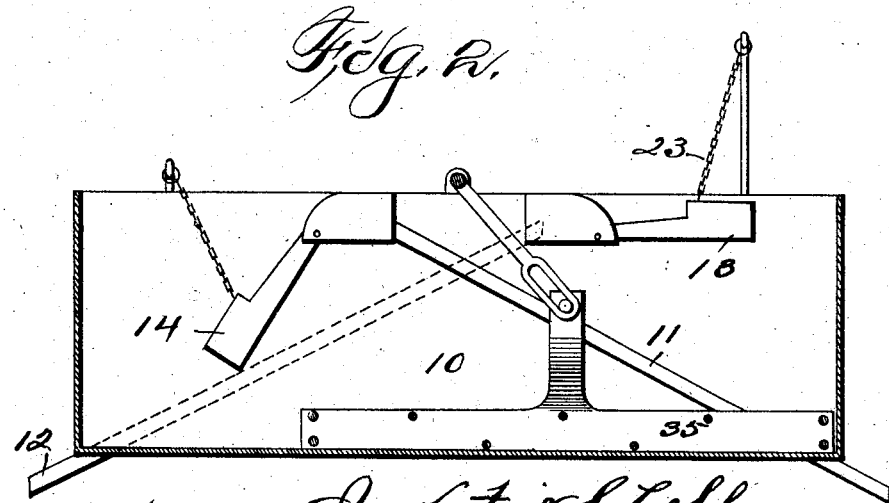

Figure 1 is a longitudinal sectional elevation of the complete apparatus with a part of the reagent-container broken away to illustrate the means for discharging a quantity of the chemical solution into the mixing-chambers. Fig. 2 is a longitudinal sectional elevation of the reagent-container. Fig. 3 is a plan of the complete apparatus. Fig. 4 is a detail view of the valve-operating parts.

Referring to the drawings, the apparatus consists of a container 10 for the reagent. This container is provided with gutters or troughs 11 and 12 and buckets 13 and 14, pivoted to the upper ends of the gutters, the bucket 13 discharging into the gutter 12 and thence to a chamber 15 and the bucket 14 discharging into a gutter 11 and thence to a chamber 16.

The natural or crude water to be treated is led direct through an inlet-pipe 17 into the oscillating receiver 18, and when this receiver is partially filled the center of gravity is moved and the receiver oscillated in such manner as to pour out its contents into one or the other of the chambers 15 or 16.

The receiver 18 is mounted and articulates on a shaft 19, having suitable bearings fixed to the sides of the chambers 15 and 16. Near each end of the receiver is a dam 20 to retain a quantity of water there for purposes hereinafter made clear.

That end of the receiver 18 which discharges into the chamber 15 is filled, descends, and the bucket 13 is lifted by means of the rod 21, pivoted to the receiver at its one end and to a vertically-movable rod 22, fixed to the side of the container 10, and a chain 23, fixed to the top of the rod 22 and to the outer end of the bucket 13, the contents of which is discharged into the gutter 12 and thence to the chamber 15.

A float 24 is arranged in the chamber 15 and is provided with a tubular extension 25, which embraces a guide-rod 26, secured to the bottom of the chamber 15. As the water in the chamber rises the tubular extension of the float engages and lifts the one end of the oscillating receiver, thus stopping the flow of water into the chamber 15 and directing it to flow into the chamber 16. Outlet-pipe 27 and 28 in the chambers 15 and 16 are automatically opened and closed by means of valves 29 and 30. Levers 31 and 32 are pivoted to and carried by the shaft 19 and are engaged by the bottom of the oscillating receiver 18, the lever 31 being connected with the valve 30 by means of a rod 33 and the lever 32 being connected with the valve 29 by means of a rod 34. As the oscillating receiver moves to discharge into one or the other of the chambers 15 or 16 the levers 31 and 32 are operated to open and close the valves 29 and 30, and the water that is retained in the receiver 18 by the dams 20 is caused to flow in a body over to the side where the valve is to be closed and by its weight hold the valve against the mouth of the outlet-pipe, and thus prevent the escape of water. Simultaneously with the operation of the parts to close one of the valves similar devices are arranged to open the other valve.

To maintain the reagent in the container 10 in a perfect and constant solution, an agitator 35 is provided and is moved longitudinally of the container with each operation of the oscillating receiver 18.

The float in the chamber 16 is the counterpart of the float 24 in the chamber 15 and is to perform the same function and operate in the same manner.

In practical use water is supplied to the oscillating receiver 18 through the inlet-pipe 17, which when it is partially filled oscillates in one direction and closes the valve 29 in the chamber 15, at the same time opening the valve 30 in the chamber 16. The agitator 35 is then moved in the container 10 and the bucket 13 caused to discharge a quantity of the reagent into the chamber 15. As the flow of water continues into the chamber 15 the float 24 rises, the tubular extension 25 of which engages and lifts the oscillating receiver to a position over "center," thus directing the water to flow into the chamber 16, the arrangement of the lever 31 for closing the valve 30 being such as to cause said valve to be seated before the contents of the receiver is discharged into the chamber 16, and the water in said receiver, retained therein by the dam 20 at the opposite end, is directed in a body to flow over to and be retained by a second dam 20 to lend such weight to the oscillating receiver as will assure the perfect seating of the valve 30.

The operation is continuous, and so long as water is directed to the oscillating receiver the reagent is automatically discharged into one or the other of the chambers, the agitator in the reagent-container is moved, and the valves in the mixing-chamber are operated to open or close.

Having thus described our invention, what we claim as new therein, and desire to secure by Letters Patent of the United States therefor, is—

1. An apparatus for purifying water embodying a reagent-container, a pair of tanks therebeneath, an oscillating receiver, a pair of oppositely-inclined stationary gutters leading from said container to said tank, a bucket pivoted to the top of each container, and a connection between each end of said receiver and the adjacent bucket.

2. An apparatus for purifying water embodying a reagent-container, a pair of tanks beneath, and an oscillating receiver, a pair of oppositely-inclined stationary gutters leading from said container to said tank, a bucket pivoted to the top of each gutter, vertically-movable rods, flexible connections between said rods and said buckets, and second rods pivoted to said first-named rods and said receiver.

3. An apparatus for purifying water, embodying a reagent-container, a pair of tanks therebeneath, an oscillating receiver, a gutter leading from said container to each of the tanks, means for elevating a quantity of said reagent into said gutters, agitating means in the container movable in a horizontal plane and sliding on the bottom of said reagent-container, and connections between each of said elevating means and said agitator whereby when said receiver is operated said elevating means will be oppositely operated in unison and said agitating means will be given movement simultaneously therewith.

4. In an apparatus for purifying water, a pair of tanks, an oscillating receiver, an outlet-pipe for each tank, a pair of pivoted levers engaged by the bottom of the tank, a valve for each outlet, and rods connecting said levers and valves.

5. An apparatus for purifying water embodying a reagent-container, tanks therebeneath, an oscillating receiver, stationary gutters leading from said container to each of the tanks, said gutters having their upper ends terminating adjacent the top of said container, buckets having their one end pivoted to said gutters and having their opposite ends movable downwardly to points adjacent the bottom of the container, and means operated from said receiver to raise and lower said buckets with respect to said gutters.

6. An apparatus for purifying water, embodying a reagent-container, a pair of tanks therebeneath, an oscillating receiver, an inclined stationary gutter leading from said container to each of said tanks, a bucket pivoted to the top of each gutter, and means connected to the ends of said receiver and the opposite ends of each of said buckets for operating the latter.

7. An apparatus for purifying water, embodying a pair of tanks, an oscillating receiver, a reagent-container, an agitator for said container sliding horizontally on the bottom thereof, and a rod having its intermediate portion relatively stationary with respect to the container receiving movable support therefrom, and having its ends connected to said agitator and said receiver.

8. An apparatus for purifying water, embodying a reagent-container, a pair of tanks therebeneath, a receiver, a pair of oppositely-disposed inclined gutters in said container leading into said tanks, a bucket pivoted at one end to each gutter, vertically-movable rods connected to the opposite ends of the buckets, and means for operating said rods from said receiver.

SOLOMON L. SHEUERMAN.
JUAN F. HAND.

Witnesses:
  R. G. ORWIG,
  J. E. BOWERS.